July 9, 1935.  H. W. MILLMINE  2,007,501
ROD PACKING
Filed April 1, 1933  3 Sheets-Sheet 1
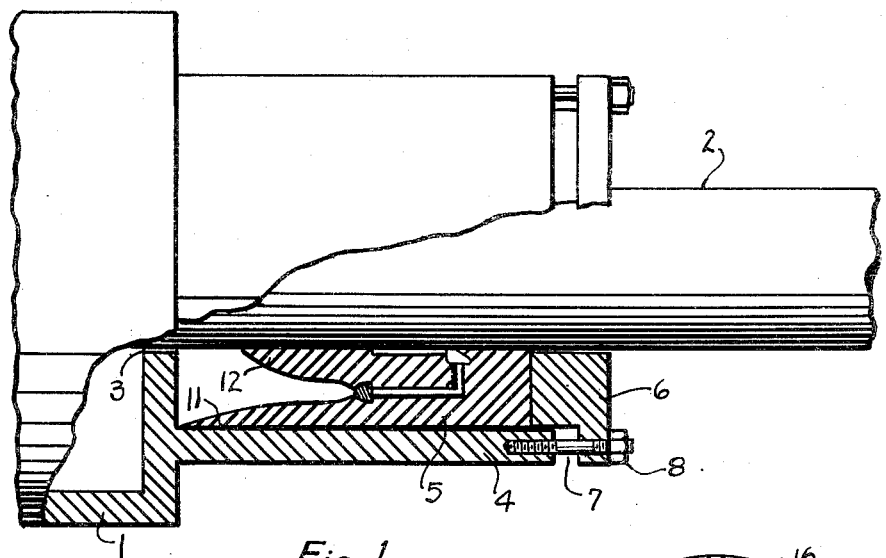
Fig. 1
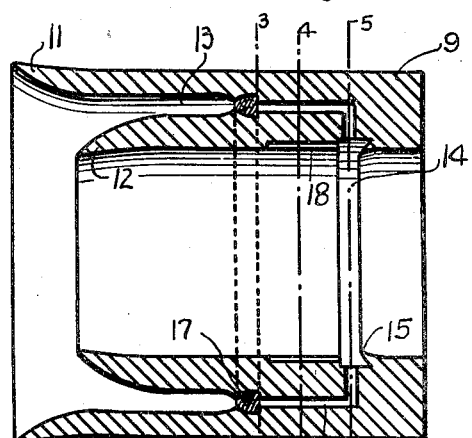
Fig. 2
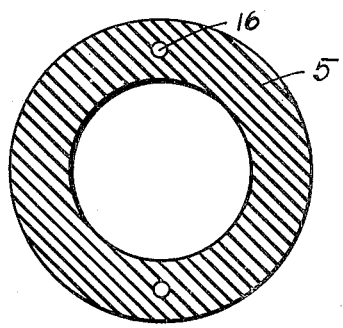
Fig. 3
Fig. 4
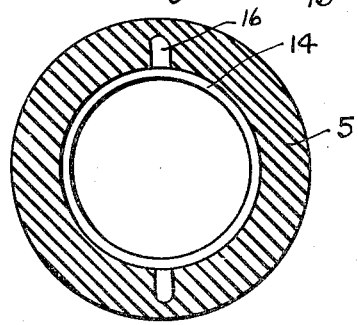
Fig. 5
INVENTOR.
Herbert W. Millmine
BY Jesse R. Stone
Lester B. Clark
ATTORNEYS

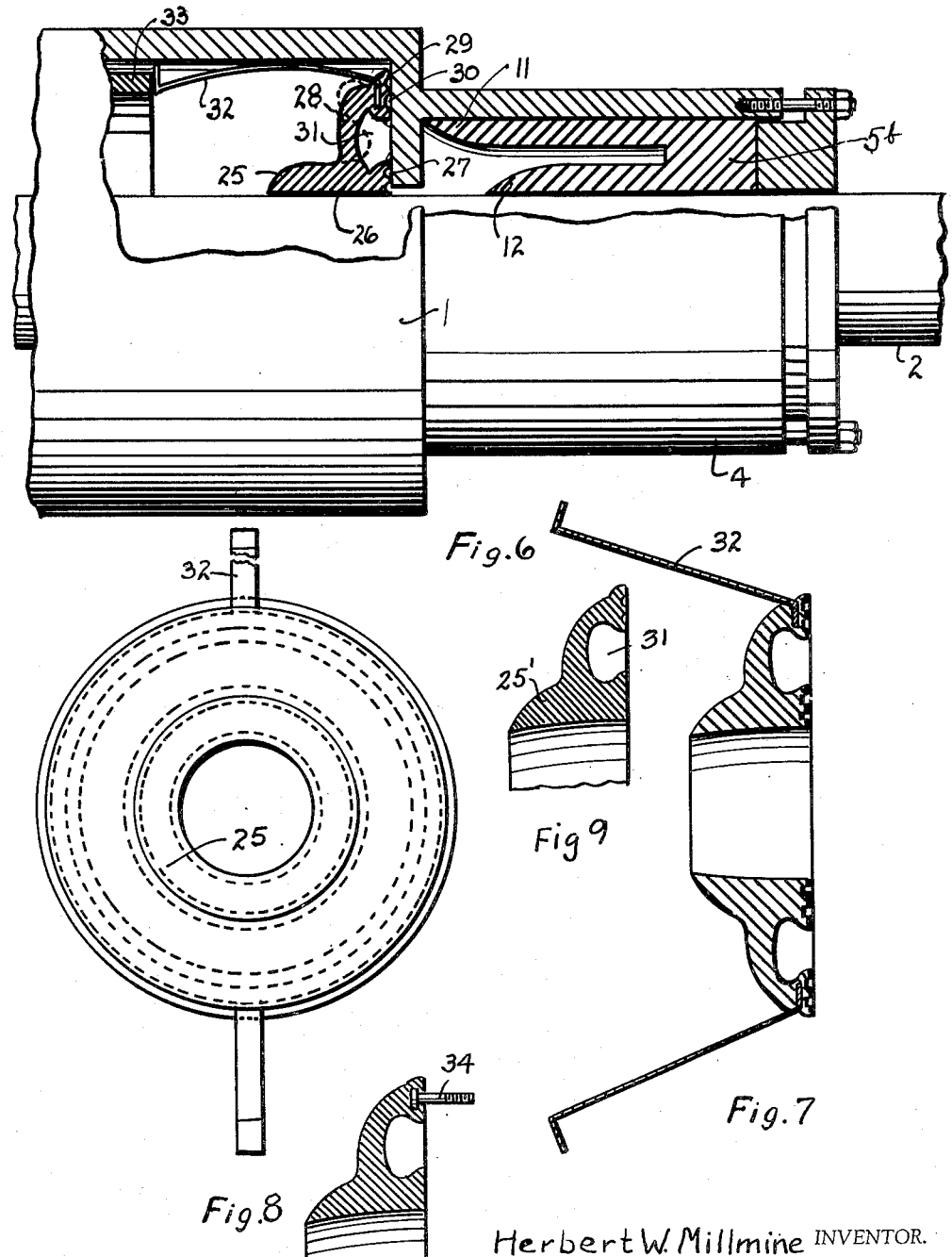

July 9, 1935. H. W. MILLMINE 2,007,501
ROD PACKING
Filed April 1, 1933 3 Sheets-Sheet 3

INVENTOR.
Herbert W. Millmine
BY Jesse R. Stone
Lester B. Clark
ATTORNEYS

Patented July 9, 1935

2,007,501

UNITED STATES PATENT OFFICE 2,007,501

ROD PACKING

Herbert William Millmine, Houston, Tex.

Application April 1, 1933, Serial No. 663,879

4 Claims. (Cl. 286—26)

My invention relates to packing means for sealing about a moving rod or shaft. It is particularly designed for use around a piston rod ordinarily employed in heavy duty pumps, although its application is general.

In pumping liquids having sand or grit therein, and particularly where the pressures handled are necessarily high it is a common difficulty that the sand will work in around the bearings between the rod and the adjacent box or cylinder and cause excessive wear upon the rod so that the piston rod has to be removed and changed at frequent intervals.

It is an object of my invention to provide a packing about a moving rod which will be automatically expanded into sealing position by the fluid being pumped, particularly on the pressure stroke of the pump but which will not bear heavily upon the shaft during the suction stroke thereof.

It is a further object of the invention to provide means for circulation of a cooling fluid about the shaft and packing during operations so as to cool the shaft and also act as a lubricant preventing wear.

It is a further object of the invention to provide means whereby the circulation of cooling fluid about the shaft may be performed automatically in the operation of the pump.

I further desire to provide means to seal off the admission of sand or sediment to the rod packing, particularly on the pressure stroke of the pump.

Another object of the invention also includes means whereby the sealing means about the shaft may be held in position while the pump is operating.

Another object is to provide an effective means for securing the packing in position so that it can be removed.

In the drawings herewith, Fig. 1 is a side view partly in central vertical section, illustrating a stuffing box with one form of my improved packing therein.

Fig. 2 is a longitudinal section through the packing member removed.

Figs. 3, 4 and 5 are transverse sections taken on the planes 3—3, 4—4, and 5—5, respectively, of Fig. 2.

Fig. 6 is a side view, partly in elevation and partly in vertical section illustrating my packing employed with a preferred form of sealing member within the pump cylinder.

Fig. 7 is a central section through the sealing member disclosed in Fig. 6.

Fig. 8 is an end elevation of the sealing member shown in Fig. 7.

Fig. 9 is a broken sectional detail of a slightly different embodiment of the sealing member.

Figure 11:
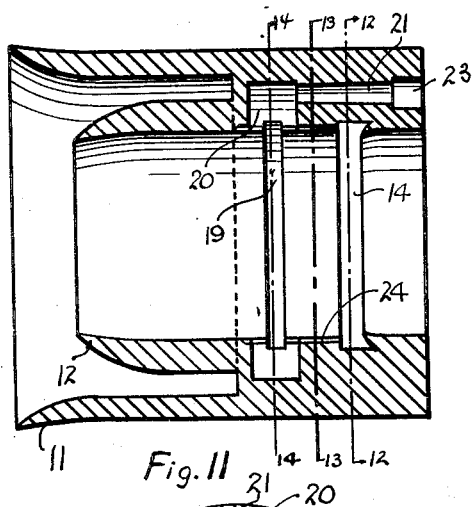
Fig. 11 is a central longitudinal section through the packing member shown in Fig. 10 removed from the box.
Figure 12:
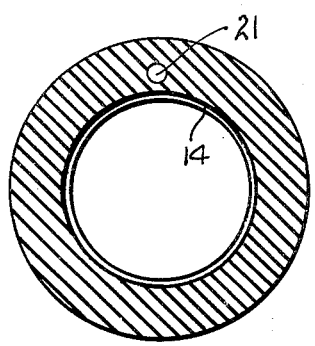
Figure 13:
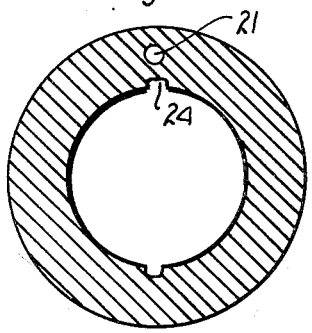
Figure 14:
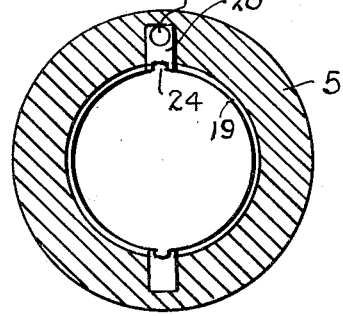

Figs. 12, 13 and 14 are transverse sections on the planes 12—12, 13—13, and 14—14, respectively, of Fig. 11.

Fig. 15 is a broken sectional detail of a sealing member with a slightly different means of securing it in position.

In Fig. 1, I have shown the broken end of a pump cylinder 1 within which the usual pump piston is adapted to operate. A pump rod 2 extends through the opening 3 in the end of the cylinder and projects through a stuffing box formed by an outwardly extending sleeve 4 adapted to receive a packing sleeve 5 of compressible material. There is a gland 6, fitting within the outer end of the box and adapted to be tightened against the packing 5 by means of bolts 7 and nuts 8 in the usual manner.

The packing sleeve 5 is shown best in Fig. 2. It is preferably made of rubber or similar material, the outer end of which is approximately cylindrical, as shown at 9. The inner end, however, is formed with an outwardly flaring lip 11, and an inwardly flaring lip 12, which is of shorter length than the lip 11. Between the two lips is a compression space 13 within which the fluid being pumped may be received to exert a pressure against both lips to hold them resiliently in sealing engagement. The lip 11 engages with the wall of the box while the lip 12 has a sealing engagement with the shaft, and it is understood that both lips are urged into sealing position by the fact that they are curved or flared toward the surface against which they seal.

In order to cool the shaft and to some extent prevent wear thereon, I provide an annular recess or chamber 14 formed on the inner periphery of the packing sleeve. This recess has on its outer end an undercut portion which forms a lip 15 and this lip is formed so that it is curved inwardly to a slight extent so as to bear resiliently against the shaft 2. This recess 14 is adapted to receive fluid from the chamber 13 by way of a plurality of channels or ducts 16 leading from said chamber longitudinally of the sleeve and then through a branching duct to the recess 14. I contemplate placing filtering or straining material 17 in the inlets to these ducts 16, so that in case sand or sediment accompanies the fluid it will be strained out by passing into the recess 14.

In addition to the annular recess or chamber 14, I connect longitudinally extending grooves 18, on the inner wall of the sleeve, with the recess so as to receive therefrom a portion of the cooling liquid.

In the use of this packing sleeve it will be seen that on the pressure stroke of the piston the fluid within the cylinder 1 will tend to escape outwardly along the shaft and such escape will be prevented along the surface of the shaft by the inner lips 12, which will be forced more firmly into sealing engagement by the pressure fluid. The outer lip 11 will seal against the wall of the stuffing box. The lip 12 is shorter than the lip 11, because it is not desired that said lip 12 be engaged with the end of the box. If there is a tendency for the fluid to escape along the box, the gland may be tightened to expand the lip 11, but in no case will the lip 12 be forced into engagement with the end of the box and it will be free to allow the passage of fluid from the interior of the recess 14 along the shaft on the suction stroke of the pump. Thus there will be a tendency of the circulation of the fluid which has been forced into the chamber 14, inwardly along the shaft, as well as through the ducts or channels 16. This will carry off any sand or sediment which might tend to work in around the shaft and further tend to prevent heating of the rod along the packing. Experience with this type of packing has shown that it will wear for materially longer periods of time without the necessity of change than has been the experience with previous forms of packing. Furthermore, the rod is not worn and the necessity for changing the rod becomes less frequent.

Figure 10:
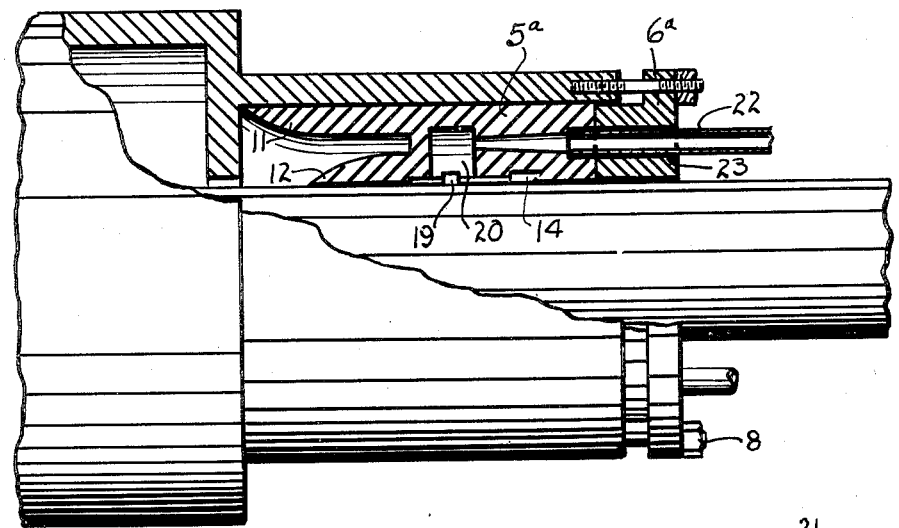
Fig. 10 is a side view partly in central vertical section showing a somewhat different embodiment of the packing member.

In the embodiment shown in Fig. 10, the packing sleeve 5a is constructed similarly to the packing sleeve in the Fig. 1 embodiment, except that the arrangement for circulating cooling fluid along the interior of the packing has been modified in this embodiment. The packing sleeve is formed intermediate its ends with an annular channel or recess 19 therein, said recess having opposite chambers 20 connecting therewith. The chambers 20 in turn are connected by means of passageways 21 with a tube 22, which extends through an opening 23 in the gland 6a. There are two of these tubes 22 extending inwardly to connect with the chamber 19, so that if desired the fluid may be circulated through the tubes and around the interior of the packing and back out through the opposite tube. However, as will be obvious, one of the tubes may be eliminated, in which case the circulation will be less free. In this embodiment also we have the same recess 14 as in the other embodiment and this recess is connected with the recess or chamber 19 by longitudinal channels 24 on the interior of the sleeve.

In this embodiment of the invention the circulation of cooling fluid will be from an outside source or may be connected around with the pump, but in either case there may be a force exerted on the cooling liquid which will tend to force it past the lip 12, so as to wash away sand or sediment tending to gather beneath the lip adjacent the shaft. The cooling of the packing may be somewhat more effectively accomplished with this embodiment of the invention.

In Figs. 6 to 8, inclusive, I have illustrated in connection with a packing sleeve 5b an additional member 25, which acts as a fluid seal around the shaft within the end of the cylinder 1. This member constitutes a seal also with the end of the cylinder due to its particular shape or formation. It is made up of a short ring or collar 26 adapted to fit about the shaft. The end of the collar 26 adjacent the outer wall of the cylinder is formed with annular grooves or corrugations 27, which form air pockets which may assist in forming a seal against the cylinder wall. There is an outwardly flaring wall 28 upon the sleeve, which is curved inwardly at its outer margin and formed with a suction member 29 thereon, which is grooved at 30 to form a suction surface engaging the end of the cylinder. There is thus a so-called vacuum chamber 31, formed between the wall 28 and the end of the cylinder, which, when the said wall is compressed inwardly by the pressure of the fluid, will drive the air out of the chamber 31 and tend to form a vacuum therein when the pressure is relieved. The outer margin of this ring is held normally in position by spring arms 32, which are embedded within the outer portion of the sealing member at one end and bear against the inner end of the liner 33 at the other end, and are under compression tending to maintain the sealing member in operative position.

This sealing member assists in preventing the escape of fluid with sand or sediment therein from the cylinder and will assist in preserving a seal at the end of the cylinder during the operation of the pump.

As shown in Fig. 9, the sealing member 25' may be formed without the spring arms 32, in which case the sealing member will be held in place entirely by the suction exerted by the partial vacuum within the chamber 31.

In Fig. 15, I have illustrated the outer margin of the sealing plate as being retained against the end of the cylinder wall by means of studs or screws 34, which may be secured within the ends of the cylinder.

The sealing member 25 will be of material assistance in the preventing of wear around the shaft. It will prevent the passage of abrasive material into the packing chamber and will tend to hold itself firmly sealed against the end of the cylinder wall by the partial vacuum obtaining beneath the wall of the plate and the cylinder within the chamber 31.

The advantages of my present construction lie in the fact that it is a simple and cheap construction which will maintain a seal against the passage of liquid or other fluid and will be brought into firm sealing engagement with the shaft only on the pressure stroke. Unlike the usual packing, which is compressed within a stuffing box, it hugs the shaft tightly only on the pressure stroke and on the suction stroke the pressure is relieved so that the wear on the shaft only tends to take place on one of the working strokes of the piston rod. The tendency for wear upon the shaft is therefore approximately half that which occurs in the usual type of compressible packing rings. Furthermore, the making of the interior lip of the packing, which engages the shaft, shorter than the outer lip, assures that there will be no mechanical part engaging this lip at the end to force it against the shaft on the suction stroke. The wear will therefore be materially lessened.

What I claim as new is:

1. A packing device for rods comprising a stuffing box about the rod, a packing sleeve therein, inwardly and outwardly directed lips on the inner end of said sleeve with a fluid receiving chamber between them, an inner annular fluid-receiving groove in said sleeve, and means whereby fluid may be conducted to said groove.

2. A packing device for rods comprising a stuffing box about the rod, a packing sleeve therein, inwardly and outwardly directed lips on the inner end of said sleeve with a fluid receiving chamber between them, an inner annular fluid-receiving groove in said sleeve, passages from said chamber to said groove and filtering material in the trough of said fluid-receiving chamber to filter fluid passing to said groove.

3. A packing device for rods including a stuffing box about said rod, a sleeve of compressible packing material about said shaft in said box, spaced lips on the inner end of said sleeve engaging said rod and the inner wall of said box, said lips being presented toward the source of fluid pressure, an inner annular channel on said sleeve, and means whereby cooling fluid may enter into said channel to cool and lubricate said rod.

4. A packing device for rods including a stuffing box about said rod, a sleeve of compressible packing material, about said shaft in said box, spaced lips on the inner end of said sleeve engaging said rod and the inner wall of said box, said lips being presented toward the source of fluid pressure, a plurality of recesses in the inner wall of said sleeve, and means to conduct liquid to said recesses.

HERBERT WILLIAM MILLMINE.